United States Patent [19]
Kuypers

[11] Patent Number: 5,753,795
[45] Date of Patent: May 19, 1998

[54] DEMOUNTABLE VACUUM-SEALING PLATE ASSEMBLY

[75] Inventor: Ned R. Kuypers, Palo Alto, Calif.

[73] Assignee: Hewlett-Packard Company, Palo Alto, Calif.

[21] Appl. No.: 644,387

[22] Filed: May 10, 1996

[51] Int. Cl.$^6$ .................... G01N 31/08; G01N 03/08
[52] U.S. Cl. .................... 73/23.37; 73/865.6; 73/866.5; 73/431
[58] Field of Search .................... 73/23.37, 23.42, 73/865.6, 866.5, 431

[56] References Cited

U.S. PATENT DOCUMENTS

| | | | |
|---|---|---|---|
| 2,373,333 | 4/1945 | St. Onge | 257/9 |
| 3,018,561 | 1/1962 | Wells | 34/51 |
| 3,084,454 | 4/1963 | Schueller | 35/12 |
| 3,398,569 | 8/1968 | Pollock et al. | 73/1 |
| 3,426,591 | 2/1969 | Struben et al. | 73/865.6 |
| 3,664,181 | 5/1972 | Conrad et al. | 73/71.6 |
| 3,709,026 | 1/1973 | Rhodes et al. | 73/12 |
| 4,089,207 | 5/1978 | Patton | 73/23.1 |
| 4,287,764 | 9/1981 | Staab et al. | 73/431 |
| 4,548,699 | 10/1985 | Hutchinson et al. | 204/298 |
| 5,274,356 | 12/1993 | Taricco | 340/515 |
| 5,499,665 | 3/1996 | Gold et al. | 141/1 |

*Primary Examiner*—Hezron E. Williams
*Assistant Examiner*—J. David Wiggins

[57] ABSTRACT

A detachable, vacuum-sealing plate assembly is provided for vacuum chamber access. The assembly has a demountable hinge, thereby permitting the plate to be swung open or closed, or completely removed from the chamber. The swung-closed plate is automatically pressure-sealed to the chamber during vacuum pump-down by the pressure differential between the interior of the chamber and the outside atmosphere. The plate is released upon vacuum venting, thereby providing swing-open access to the chamber. Functional components may be mounted to the plate. The plate may also have associated high-vacuum electrical fluid flow-path transfer or physical component feed-throughs.

20 Claims, 7 Drawing Sheets

DEMOUNTABLE VACUUM-SEALING PLATE ASSEMBLY

BACKGROUND OF THE INVENTION

1. Technical Field

The present invention relates to vacuum chambers or systems. More particularly, the present invention relates to a removable door for a vacuum chamber.

2. Description of the Prior Art

In high-vacuum instrumentation, it is necessary to provide demountable seals to access instrument components housed within the vacuum system. These components must be accessed, for example, for servicing, cleaning, or for periodic exchange.

Figure 1:
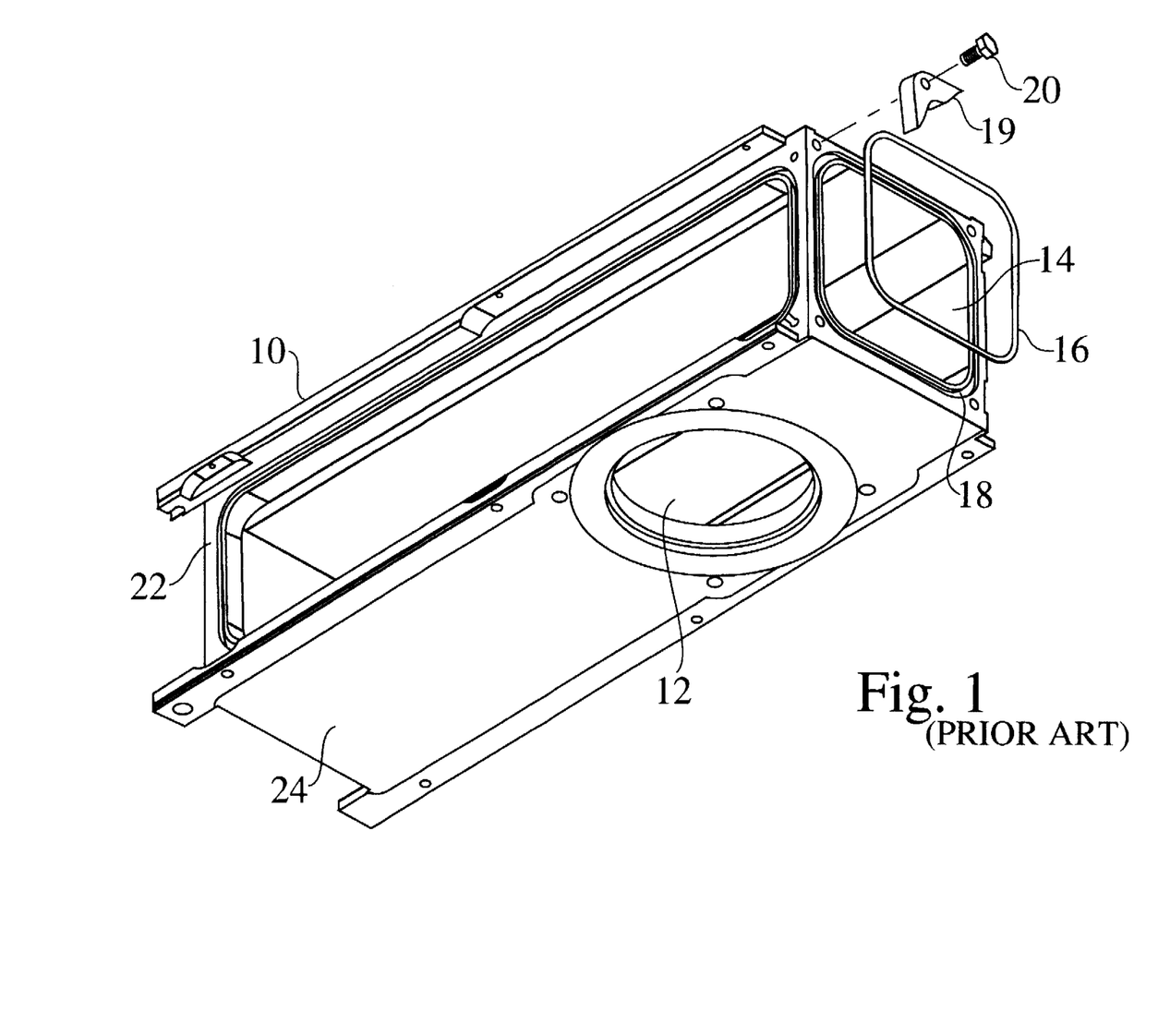
FIG. 1 is an isometric view of a vacuum chamber having high-vacuum plates, according to the prior art.

In the prior art, high-vacuum flanges or plates are sealed to the vacuum chamber using elastomeric "O-rings", gaskets, or other "soft-metal" type seals. Such flanges or plates may also provide the mounting for various components, such as a mass spectrometer analyzer. FIG. 1 is an isometric view of a vacuum chamber (10) having high-vacuum plates, according to the prior art. Such plates are typically shaped to seal round (12) or substantially rectangular (14) openings.

The O-ring (16) fits into a groove (18) that may be formed either in the plate or in the chamber itself. The plate (19) is installed over the opening and compressively held in place by fasteners such as bolts (20) or clamps. The O-ring seal material is thereby compressed between the vacuum plates or flanges and the vacuum chamber.

It is known in the prior art to use the pressure differential between the inside of the pumped-down chamber and atmospheric pressure to seal the plate to the opening. However, such pressure sealing has heretofore required the substantial weight of the plate to initially seal the opening under the weight of gravity prior to vacuum initiation. The prior art pressure seal is thus not usable for vertical openings in the side (22), or openings in the bottom (24) of a vacuum chamber, without the additional use of clamps or bolts.

Figure 2:
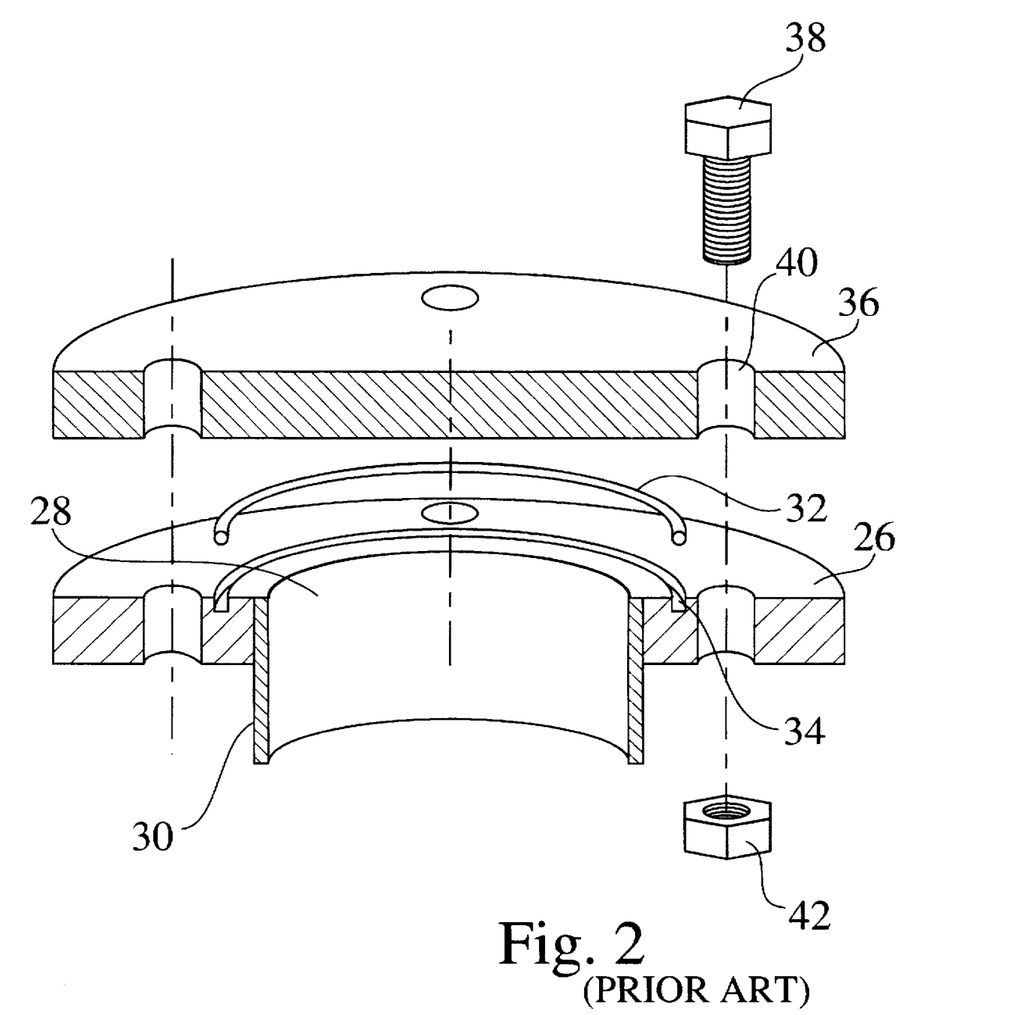
FIG. 2 is a side sectional view of a bolted plate, according to the prior art.

FIG. 2 is a side sectional view of a bolted plate, according to the prior art. A flange (26) surrounds an opening (28) in the vacuum chamber (30). The O-ring (32) fits within the groove (34) formed in the flange. The plate (36) is placed over the opening. Bolts (38) are then inserted through apertures (40) formed in the plate and flange. Finally, nuts (42) are mated to the bolts to compressively seal the plate to the chamber.

These prior art seals do not provide quick and convenient access to the inside of the vacuum chamber. The bolted plate requires use of a tool to remove or install the bolts. The plate must be entirely removed from the vacuum chamber. Thus, any components mounted on the plate must also be removed. When the removed plate is then placed on a surface or a rack for storage, the user must be careful not to damage the mounted components.

It would be an advantage to provide a demountable sealing plate that may be used on all sides of a vacuum chamber. It would be a further advantage if this demountable sealing plate provided access to the interior of a vacuum chamber without requiring complete plate removal.

SUMMARY OF THE INVENTION

The invention provides a detachable, vacuum-sealing plate assembly for vacuum chamber access. The assembly has a demountable hinge, thereby permitting the plate to be swung open or closed, or completely removed from the chamber. A hinge assembly allows the hinge to move, permitting a seal such as an O-ring to be compressed, thereby sealing the opening. The swung-closed plate is pressure-sealed to the chamber during vacuum pump-down by the pressure differential between the interior of the chamber and the outside atmosphere. The plate is released upon vacuum venting, thereby providing swing-open access to the chamber.

Functional components may be mounted to the plate. The plate may also have associated high-vacuum electrical or physical component feed-throughs.

DETAILED DESCRIPTION OF THE INVENTION

The invention provides a novel demountable high-vacuum sealing plate assembly for a vacuum chamber.

Figure 3:
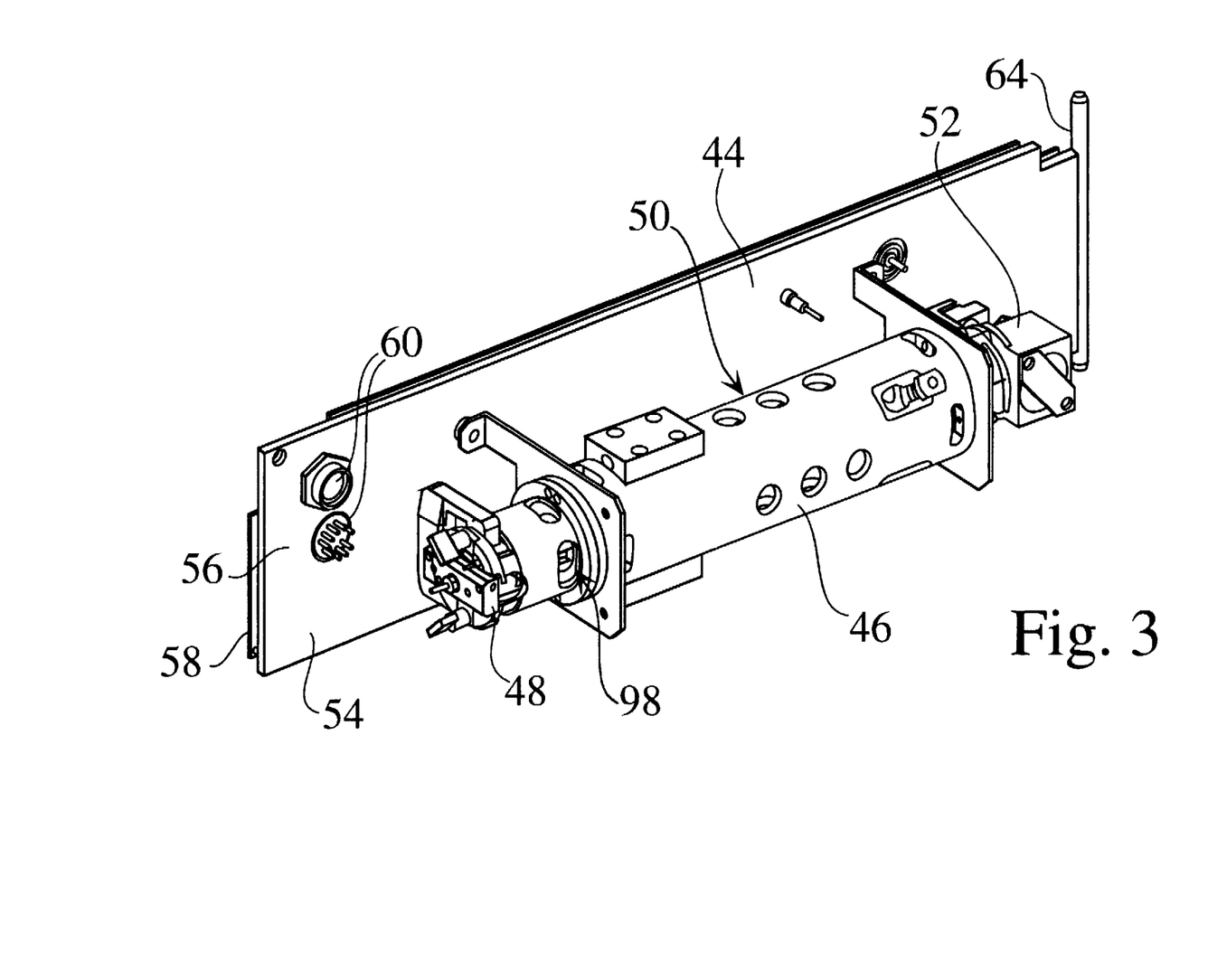
FIG. 3 is an isometric view of a demountable, high-vacuum plate assembly, according to a preferred embodiment of the invention.

FIG. 3 is an isometric view of a demountable, high-vacuum plate assembly 44, according to a preferred embodiment of the invention. Functional components, such as a mass spectrometer analyzer 46 with an ion source 48, quadrupole ion mass filter 50, and ion detector 52 are mounted to the inner (vacuum chamber) side 54 of the plate 56. It is readily apparent to one skilled in the art that alternate embodiments of the invention may have different or no components mounted to the assembly. In yet another embodiment, functional components, such as a wafer loading mechanism, are mounted to the atmospheric side 58 of the plate.

High-vacuum feed-throughs 60 may be provided through the plate. Such feed-throughs include electrical connections for applying a voltage or conducting current, as well as devices for gas or liquid transfer, such as a gas sample port or a plasma supply line.

A hinge movably connects the plate in the region of the chamber wall. The hinge pin 64 is affixed to the plate. In alternate embodiments of the invention, the plate is vertically, horizontally, or angularly hinged. More than one hinge and plate may be provided.

Figure 4:
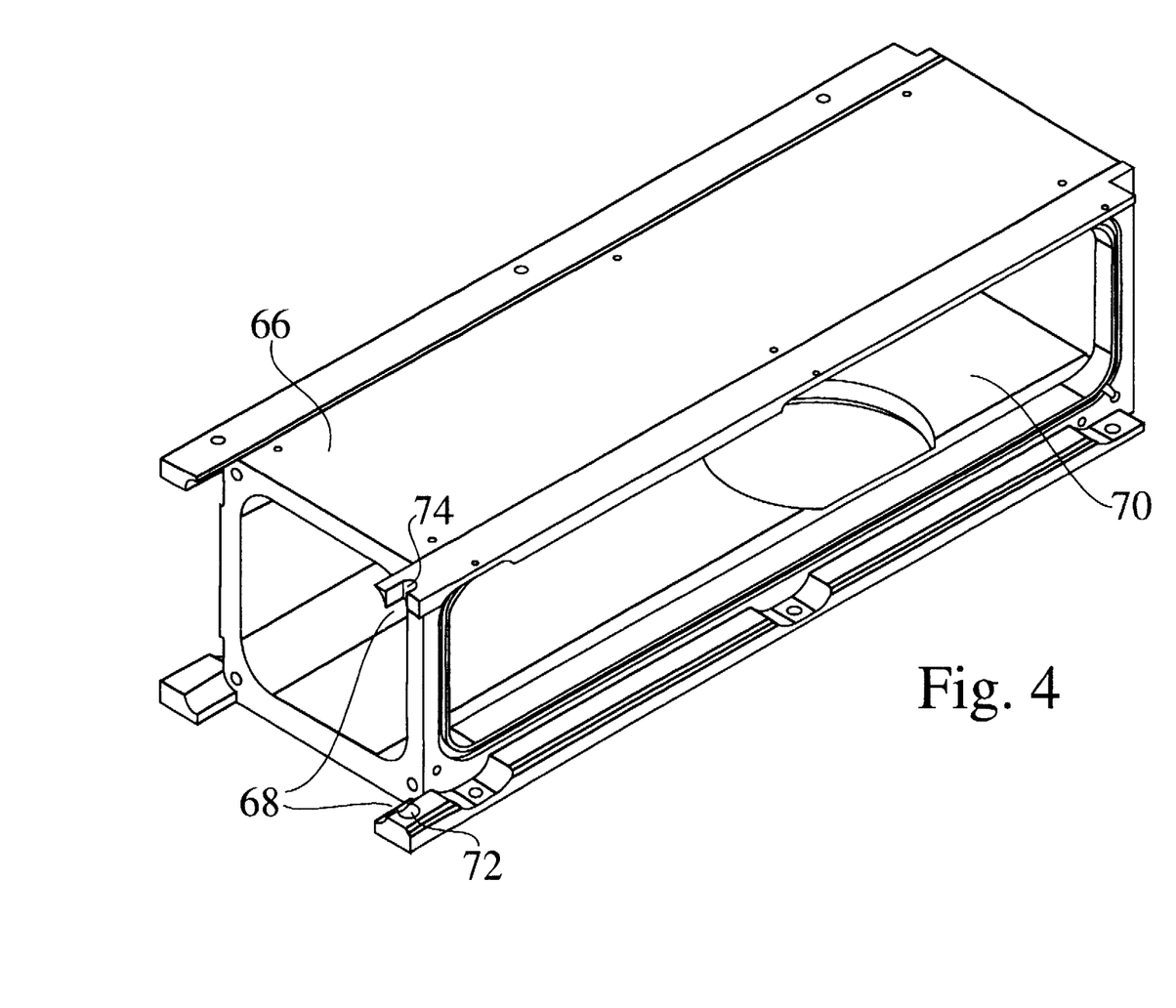
FIG. 4 is an isometric view of a vacuum chamber, according to the invention.

FIG. 4 is an isometric view of a vacuum chamber, according to the invention.

The chamber 66 has a hinge assembly 68 formed as an integral part of the chamber at each port, or opening 70, to be sealed by such invention. The hinge assembly includes a lower aperture 72 dimensioned to receive and secure an end of the hinge pin 64. Although not shown in FIG. 4, a hinge pin bushing may be inserted into this lower aperture. The opposite end of the hinge pin is removably inserted into an upper slot 74. Such hinge assembly facilitates the separation or removal of the plate assembly from the mating vacuum chamber. Although not required, hinge bushings or bearings may be included as working parts of either the hinge pin or the hinge assembly.

The hinge permits swing-open access to the chamber upon vacuum venting.

The plate is swung closed to seal the vacuum chamber at pump-down. The opening and closing may be manually or automatically performed. In the preferred embodiment of the invention, the hinge is formed of stainless steel.

However, in alternate embodiments, the hinge is formed of any material having the requisite structural strength. In this example, the hinge pin and plate are made of stainless steel, and the integral hinge assembly and chamber is made of aluminum. The vacuum plate preferably incorporates a single-axis integral hinge pin.

However, in other embodiments of the invention, a plurality of hinge pins may be used. In yet another embodiment, the hinge pin is not formed as an integral part of the assembly. Rather, the hinge pin is formed separately and subsequently attached to the assembly.

Figure 5:
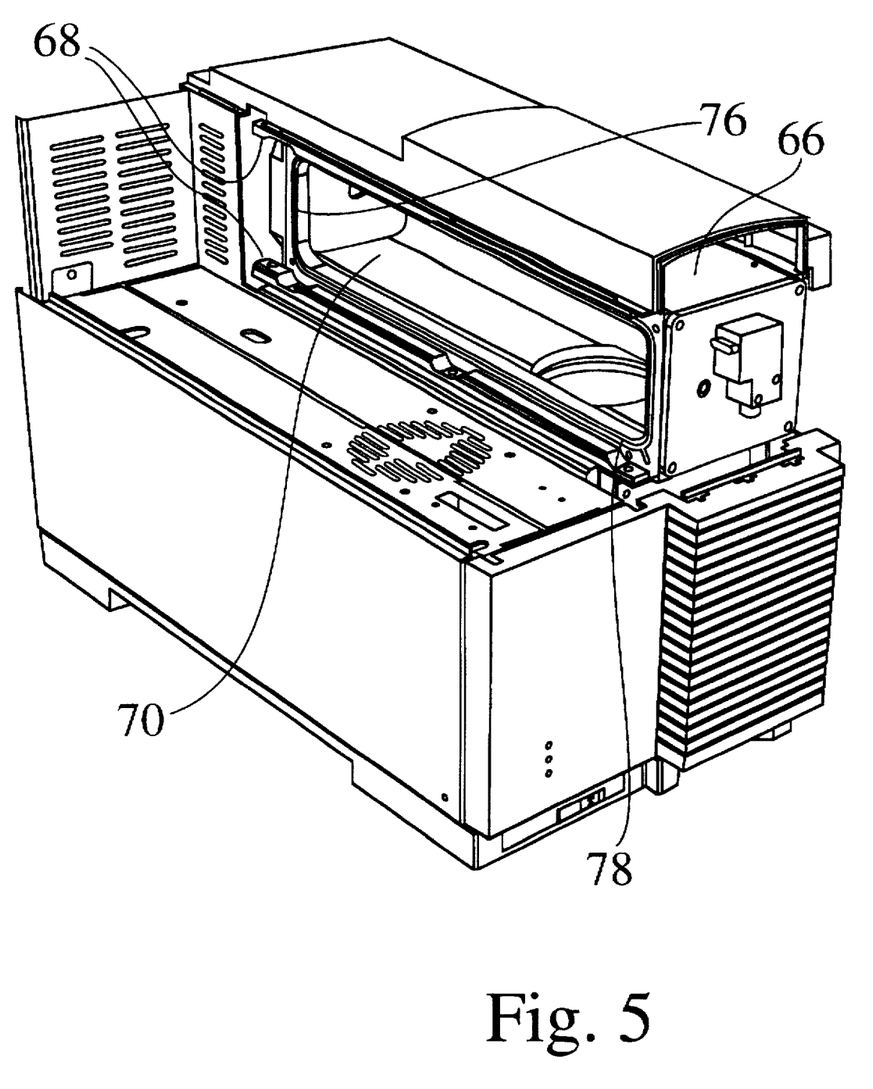
FIG. 5 is an isometric view of a vacuum chamber having a sealing groove formed therein, according to the invention.

In alternate equally preferred embodiments of the invention, a seal such as an O-ring is fit into a groove formed in the plate or in the chamber itself. FIG. 5 is an isometric view of a vacuum chamber having a sealing groove formed therein, according to the invention. In the figure, the vacuum chamber 66 has a vertical opening 70 formed therein. The O-ring 76 is fitted into a groove 78 formed in the chamber wall. The hinge assembly 68 is provided at one end of the opening.

The O-ring is preferably formed of an elastomeric, compressible material. It will be appreciated by those skilled in the art that although O-rings are described herein in connection with the presently preferred embodiment of the invention, other seals may be used to practice the invention. Upon pump-down, the O-ring seal is automatically compressed and held in place by the pressure differential. Thus, no bolts, clamps or fasteners are required.

However, in alternate embodiments of the invention, such fastening means may be provided in addition to the atmospheric-pressure sealing. Upon venting, the internal and external pressures equilibrate, and the seal is released. The door then swings open.

The hinge assembly is dimensioned to securely retain the hinge pin, while permitting the plate to be radially pivoted. However, the hinge assembly does provide sufficient space for the hinge pin to move slightly when vacuum pressure is initiated or released within the chamber. Thus, the plate may be drawn towards the chamber during pump-down, to compress the O-ring and seal the chamber. Similarly, when the chamber is vented, the plate separates from the chamber, and the O-ring is de-compressed.

Figure 6A:
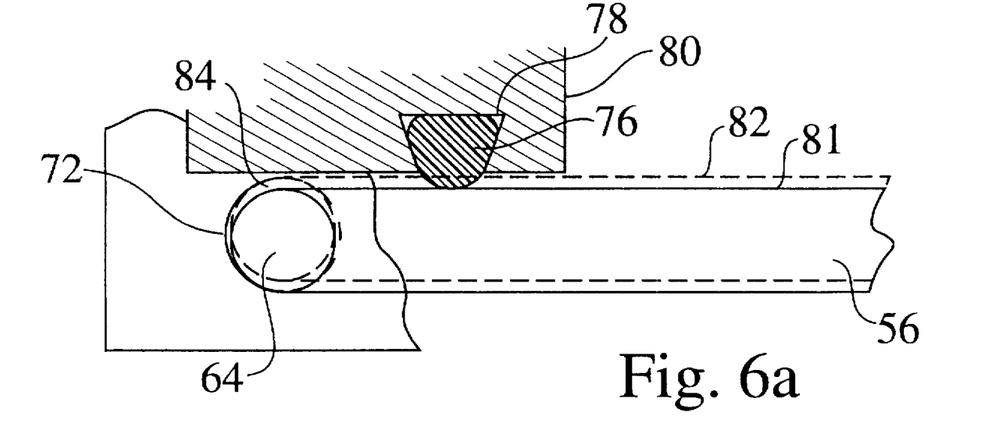
FIGS. 6a and 6b show bottom and top partial sectional views of the demountable vacuum-sealing plate assembly hinged end, according to the invention.
Figure 6B:
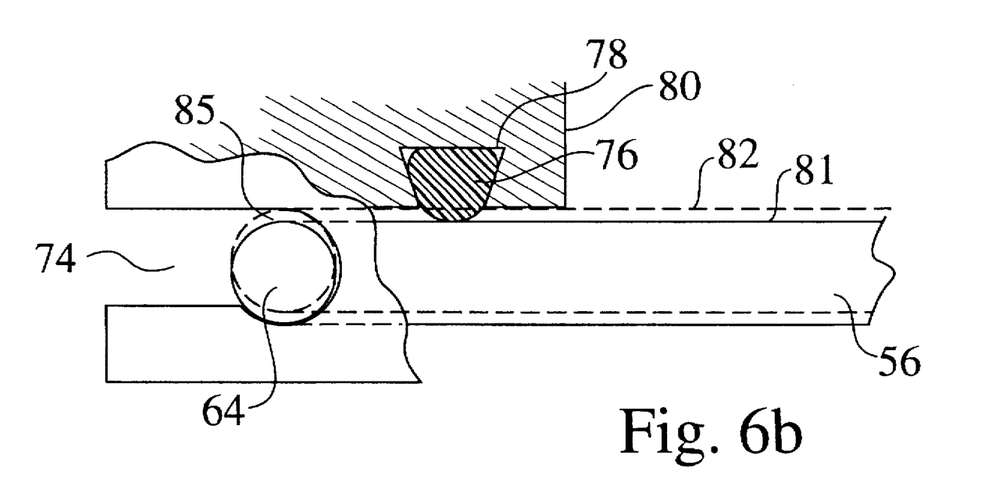

FIGS. 6a and 6b show top and bottom partial sectional views of the demountable vacuum-sealing plate assembly. The O-ring 76 is fitted within a groove 78 formed in the chamber wall 80. This groove cross-section is typically trapezoidal in shape, to retain the O-ring securely therein. The hinge pin 64 rests within the lower aperture 72 and upper slot 74. Prior to pump-down, the plate 56 is positioned such that the un-compressed O-ring touches the plate as shown in position 81. After pump-down has commenced, the plate is urged towards the vacuum chamber to provide O-ring compression to affect the vacuum seal. In this sealed position 82, the hinge pin moves within the spaces 84 and 85 provided in the lower aperture and upper slot, respectively, to permit full compression of the O-ring between the plate and grooved chamber wall.

Although dependent on the size of vacuum chamber and vacuum pumps, experimental testing has indicated that the plate is pressure-sealed to the chamber, preferably within 10–20 seconds, and more preferably within approximately 3–5 seconds of commencing the pump-down. Since the rate of venting is controlled by the user, the time for releasing the plate varies accordingly.

The demountable vacuum-sealing plate assembly may be disassembled by hand, and without requiring the use of tools or fasteners. Alternately, the chamber may be quickly accessed using the hinged vacuum door function without removing the plate. Handling of components mounted on the plate is thereby reduced, minimizing the likelihood of damage to delicate devices, and support for components being accessed is provided.

Although the invention is described herein with reference to the preferred embodiment, one skilled in the art will readily appreciate that other applications and equivalents may be substituted for those set forth herein without departing from the spirit and scope of the present invention. For example, a variety of devices, including electron microscopes, mass spectrometer analyzers, sample handlers for electron microscopes, surface science equipment, and wafer loaders may be mounted to the plate. Electronic subassemblies may also be mounted on the plate, if desired.

Figure 7:
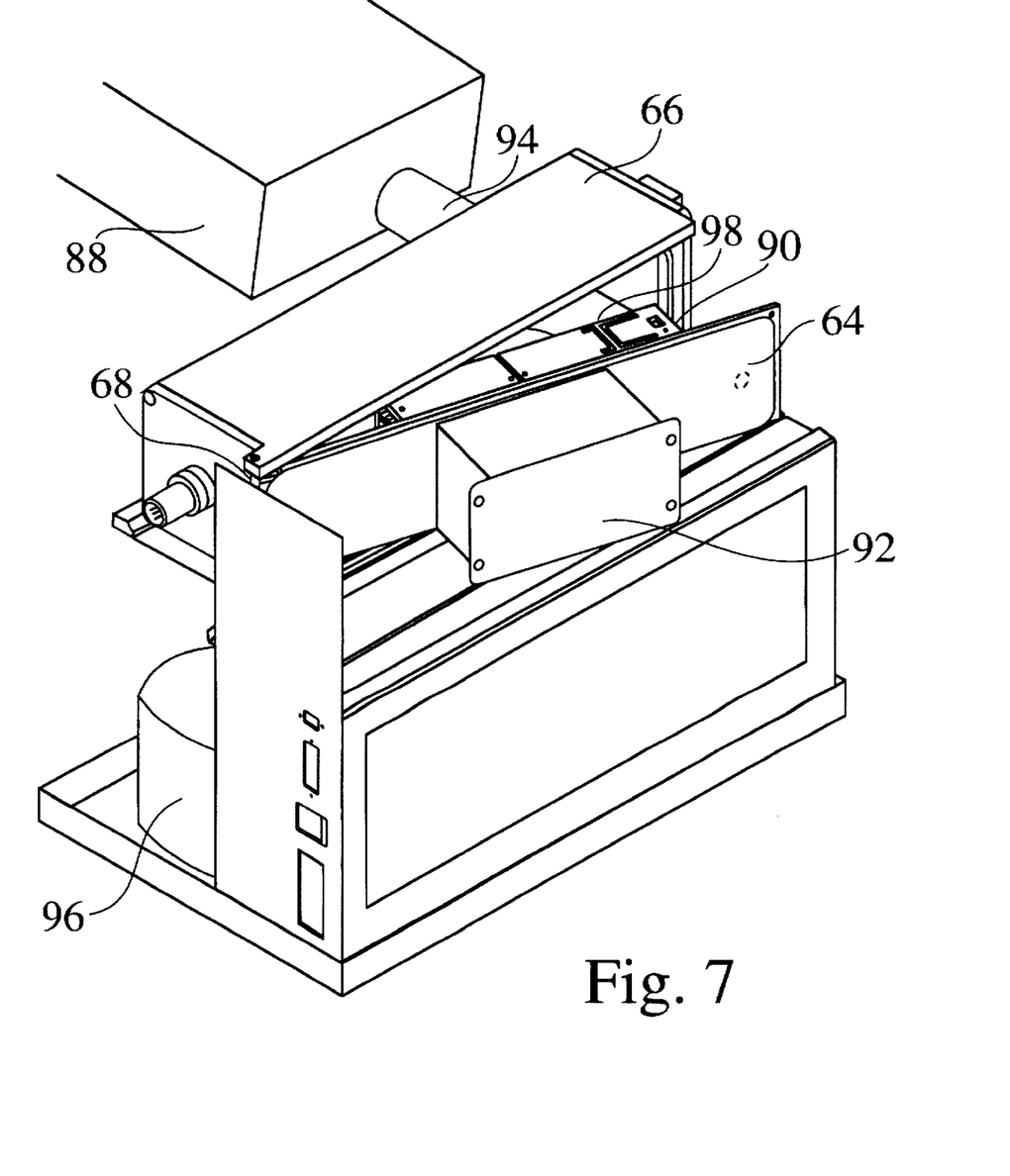
FIG. 7 shows the demountable vacuum-sealing plate apparatus according to the invention incorporated into a gas chromatograph/mass spectrometer system.

FIG. 7 shows one embodiment of the invention in which the demountable vacuum-sealing plate apparatus according to the invention is incorporated into a gas chromatograph/mass spectrometer system. The invention may also be applied to such systems as liquid chromatograph/mass spectrometer systems. In the system shown in FIG. 7, a gas sample to be tested flows from the gas chromatograph 88 and into the ion source of the mass spectrometer 90, mounted to the inside of the plate and within the vacuum chamber 66. The mass spectrometer drive electronics 92 are mounted to the outside of the plate. The vacuum pump 96 is located at any appropriate position proximate to the chamber, and is connected thereto.

In this embodiment, the hinged vacuum plate function permits engagement of the ion source, mounted to the vacuum plate 64, to the sample transfer line 94, or column, connection with the gas chromatograph. This provides automatic engagement/disengagement of the ion source with the gas chromatograph transfer line or column upon closing/opening.

In a preferred embodiment, an entrance port 98 better illustrated in FIG. 3 attached to the ion source slides over the gas chromatograph column exit-end tubulation (see FIGS. 3 and 7) within the vacuum chamber to effect a gas-tight sleeve seal upon door closure. Similarly, the sleeve seal disengages upon door opening.

While the invention does not require the use of additional fasteners, such fastener devices may also be provided. For example, a clamp may be provided to hold the plate shut during shipping and transport.

Accordingly, the invention should only be limited by the claims included below.

The invention claimed is:

1. A demountable vacuum-sealing plate assembly, comprising:

a plate dimensioned to seal an opening in a vacuum chamber, said plate comprising edges which define the dimensions thereof, first and second opposing faces and a hinge pin affixed to an edge of said plate, said hinge pin comprising first and second ends;

a hinge pin engagement assembly joined to said vacuum chamber and adapted to removably engage said hinge pin and to movably retain said hinge pin during rotation of said plate about a fixed hinge axis toward or away from said vacuum chamber opening, said hinge pin assembly comprising a lower aperture for removably retaining the first end of said hinge pin, wherein said lower aperture is suitably designed, disposed and oriented to receive align and mate with said first end of said hinge pin in a complementary manner, and an upper open and exposed slot for removably receiving the second end of said hinge pin, wherein said upper slot is suitably designed, disposed and oriented to receive, align and mate with said second end of said hinge pin in a complimentary manner.

wherein said plate is removable from said vacuum chamber by pulling the first end of said hinge pin out of the lower aperture and by sliding the second end of said hinge pin out from said upper slot in a coordinated fashion; and a seal disposed about said opening and between said plate and said vacuum chamber; and wherein a vacuum within said vacuum chamber creates a pressure differential that urges said plate towards said chamber, compressing said seal and thereby sealing said opening.

2. The demountable vacuum-sealing plate assembly of claim 1, wherein a groove for retaining said seal is defined in said plate.

3. The demountable vacuum-sealing plate assembly of claim 1, wherein a groove for retaining said seal is defined in said vacuum chamber.

4. The demountable vacuum-sealing plate assembly of claim 1, wherein said seal is formed of an elastomeric, compressible material.

5. The demountable vacuum-sealing plate assembly of claim 1, wherein said upper slot and said lower aperture are designed and dimensioned to allow said hinge pin to rotate when engaged therein and to allow said plate affixed thereto to move relative to said vacuum chamber, thereby permitting said plate to be urged towards said vacuum chamber to compress said seal and thereby seal said opening under the influence of a pressure differential across the first and second faces of said plate.

6. The demountable vacuum-sealing plate assembly of claim 1, wherein said hinge pin is a single-axis integral hinge pin incorporated into said plate.

7. The demountable vacuum-sealing plate assembly of claim 1, wherein said hinge is formed of stainless steel.

8. The demountable vacuum-sealing plate assembly of claim 1, wherein a component is mounted on said plate.

9. The demountable vacuum-sealing plate assembly of claim 8, wherein said component is mounted on said plate such that said component is enclosed within said vacuum chamber when said plate is closed.

10. The demountable vacuum-sealing plate assembly of claim 8, wherein said component is mounted on said plate such that said component is outside said vacuum chamber when said plate is closed.

11. The demountable vacuum-sealing plate assembly of claim 8, wherein said component is a mass spectrometer analyzer.

12. The demountable vacuum-sealing assembly of claim 1, wherein said plate further comprises an aperture therethrough to provide a high-vacuum feedthrough.

13. The demountable vacuum-sealing plate assembly of claim 12, wherein said high-vacuum feedthrough is an electrical connection or a device for fluid transfer.

14. The demountable vacuum-sealing plate assembly of claim 1, further comprising a fastening means.

15. The demountable vacuum-sealing plate of claim 14, wherein said fastening means is selected from the group consisting of a bolt and a clamp.

16. The demountable vacuum-sealing plate assembly of claim 1, wherein said plate is pressure-sealed to said chamber within approximately 10–20 seconds, and more preferably within approximately 3–5 seconds of commencing pump-down of said vacuum chamber, depending on size of said vacuum chamber and vacuum pumps.

17. A mass spectrometer analyzer, comprising:

a vacuum chamber;

a plate dimensioned to cover an opening defined in a vacuum chamber wall, said plate adapted to receive at least one component mounted thereon;

at least one hinge pin affixed to an edge of said plate, said hinge pin having first and second ends;

a seal disposed about said opening and between said plate and said vacuum chamber;

wherein said vacuum chamber includes an upper slot defined therein for removably receiving a second end of said hinge pin, and a lower aperture defined therein for removably retaining a first end of said hinge pin, said upper slot and said lower aperture dimensioned to allow said hinge pin to move, permitting said plate to be urged towards said vacuum chamber in response to a pressure differential resulting from a vacuum within said chamber to compress said seal and thereby seal said opening; and wherein said plate is removable from said vacuum chamber by pulling said hinge pin first end out of said lower aperture and by sliding said hinge pin second end out from said upper slot in a coordinated fashion.

18. The mass spectrometer analyzer of claim 17, wherein said analyzer is a gas chromatograph/mass spectrometer system.

19. The mass spectrometer analyzer of claim 17, wherein said analyzer is a liquid chromatograph/mass spectrometer system.

20. A method for sealing a vacuum chamber, comprising the steps of:

providing a plate dimensioned to cover an opening defined in a vacuum chamber wall, said plate adapted to receive at least one component mounted thereon;

affixing at least one hinge pin to an edge of said plate, said hinge pin having first and second ends;

disposing a seal about said opening and between said plate and said vacuum chamber;

defining an upper slot in a vacuum chamber, said slot adapted to removably receive a second end of said hinge pin and dimensioned to allow said hinge pin to move, permitting said plate to be urged towards said vacuum chamber in response to the generation of a vacuum within said chamber to compress said seal and thereby seal said opening;

defining a lower aperture in said vacuum chamber, said lower aperture adapted to retain a first end of said hinge pin and dimensioned to allow said hinge pin to move, permitting said plate to be urged towards said vacuum chamber in response to the generation of a vacuum within said chamber to compress said seal and thereby seal said opening; and inserting said hinge pin into said lower aperture and said upper slot, such that said plate is removable from said vacuum chamber by pulling said hinge pin first end out of said lower aperture and by sliding said hinge pin second end out from said upper slot in a coordinated fashion.

* * * * *